US008247067B2

(12) United States Patent
Cavallin

(10) Patent No.: US 8,247,067 B2
(45) Date of Patent: Aug. 21, 2012

(54) HEAT RESISTANT COATING COMPOSITIONS, COATED ARTICLES, AND METHODS

(75) Inventor: Carl L. Cavallin, Albertville, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 1174 days.

(21) Appl. No.: 11/665,144

(22) PCT Filed: Oct. 12, 2005

(86) PCT No.: PCT/US2005/036668
§ 371 (c)(1),
(2), (4) Date: Jun. 20, 2007

(87) PCT Pub. No.: WO2006/044455
PCT Pub. Date: Apr. 27, 2006

(65) Prior Publication Data
US 2008/0096024 A1    Apr. 24, 2008

Related U.S. Application Data

(60) Provisional application No. 60/620,179, filed on Oct. 19, 2004.

(51) Int. Cl.
*B32B 17/06* (2006.01)
*B32B 15/04* (2006.01)
*B01D 57/02* (2006.01)
*B05D 3/02* (2006.01)
*C08K 3/40* (2006.01)

(52) U.S. Cl. ............... 428/325; 427/376.3; 427/387; 427/388.1; 428/332; 428/334; 428/426; 428/447; 428/450; 524/492; 524/494; 524/588

(58) Field of Classification Search ............... 427/376.3, 427/387, 388.1; 428/325, 332, 334, 426, 428/447, 450; 524/492, 494, 588
See application file for complete search history.

(56) References Cited

U.S. PATENT DOCUMENTS

| 4,935,199 | A * | 6/1990 | Nishio et al. | 264/624 |
|---|---|---|---|---|
| 6,329,487 | B1 | 12/2001 | Abel et al. | 528/21 |
| 6,436,543 | B1 | 8/2002 | Endo et al. | 428/447 |
| 6,627,559 | B2 | 9/2003 | Shindo | 438/780 |
| 6,652,978 | B2 | 11/2003 | Lukacs, III et al. | 428/450 |
| 2003/0083453 | A1 | 5/2003 | Lukacs, III et al. | 528/10 |

FOREIGN PATENT DOCUMENTS

| JP | 63234069 | 9/1988 |
|---|---|---|
| JP | 04239075 | 8/1992 |
| JP | 6122852 | 5/1994 |

OTHER PUBLICATIONS

Thermal expansion from Wikipedia, pp. 1-12, (http://en.wikipedia.org/wiki/Thermal_expansion), Aug. 5, 2011.*
ASTM Designation: C 338-93 (Reapproved 2003), "Standard Test Method for Softening Point of Glass," Annual Book of ASTM Standards, 1993 (pp. 1-3).
International Search Report for PCT/US2005/036668 (4 pgs), Feb. 16, 2006.
Material Safety Data Sheet, Aerosil® 200, specification 132138, Degussa AG, Aerosils & Silanes, Hanau, Germany, Revised Oct. 1, 2003 (6 pgs).
Material Safety Data Sheet, Product Identification 3882 Frit, Ferro Corporation, Cleveland, Ohio, Issue date Dec. 28, 2002 (4 pgs).
Material Safety Data Sheet, Product SR112, Silicone Resin Solution, GE Silicones, Waterford, NY, Revised Jul. 16, 2002 (10 pgs). Accessed on the internet at <https://www.gesilicones.com/NASApp/gesilecomm/SShowMSDS?Product=143 &textf . . .> on Jan. 16, 2004.
Material Safety Data Sheet, KION® ML33/C33, KION® Corporation, Huntington Valley, Pennsylvania, Revision date Nov. 24, 2003 (5 pgs).
Material Safety Data Sheet, IRCOGEL ® 905, The Lubrizol Corporation, Wickliffe, Ohio, Revision date Jan. 15, 2004 (9 pgs). Accessed on the internet at <https://www.mylubrizol.com/site/ProductINfo/MSDS.asp?ProductID=81&MSDSName=IR...> on Jan. 21, 2004.
Material Safety Data Sheet, Black 444, The Shephard Color Company, Cincinnati, Ohio, Revision date Oct. 18, 2003 (6 pgs).
Product Description, KION® ML33/C33, KION® Corporation, Huntington Valley, Pennsylvania, Product Sheet Issue Date Apr. 25, 2001 (2 pgs).
Product Information datasheet, AEROSIL® 200, Hydrophilic fumed Silica, Degussa AG, Frankfurst am Main, Germany, revision date Jul. 2001 (2 pgs).
Product Information datasheet, SR112 Silicone Resin, GE Silicones, Waterford, NY, accessed on the internet at <https://www.gesilicones.com/siliconesweb/am1/en/documents/datasheets/320.html> on Jan. 16, 2004 (2 pgs).
Product Information datasheet, Ircogel® 905, The Lubrizol Corporation, Wickliffe, Ohio, Revised Jan. 1999 (2 pgs).
Technical Information Sheet, Black 444, The Shephard Color Company, Cincinnati, Ohio, Revision date Jul. 2, 2002 (1 pg). Accessed on the internet at <http://www.shephardcolor.com/techds/BK0444_full.html> on Jan. 16, 2004.
Written Opinion of the International Searching Authority for PCT/US2005/036668 (6 pgs), Feb. 16, 2006.
Foreign Office Action issued Sep. 10, 2007, in Europe, Patent Application No. 05 810 489.4-2115.
Foreign Office Action issued Apr. 20, 2009 in Europe, Patent Application No. 05 810 489.4-2115.
Foreign Office Action issued Aug. 21, 2009 in China, Patent Application No. 200580035632.0. English language translation only.
International Preliminary Report on Patentability (IPRP), issued on Jan. 23, 2007, Patent Application No. PCT/US2005/036668.
International Search Report and Written Opinion of the International Searching Authority, issued Feb. 2, 2006, International Application No. PCT/US2005/036668.

* cited by examiner

*Primary Examiner* — D. S. Nakarani

(57) ABSTRACT

A coating composition, coated articles, and methods of coating, wherein the composition includes: a resin system comprising a polysilazane and optionally a polysiloxane and/or optionally an aromatic hydrocarbon; and glass particles having a softening point below operating temperature, a coefficient of thermal expansion of at least 80, and a dielectric constant of at least 5.

30 Claims, No Drawings

HEAT RESISTANT COATING COMPOSITIONS, COATED ARTICLES, AND METHODS

CROSS-REFERENCE TO RELATED APPLICATIONS

The present application is the §371 U.S. National Stage of International Application No. PCT/US2005/036668, filed Oct. 12, 2005, which claims priority to U.S. Provisional Patent Application Ser. No. 60/620,179, filed Oct. 19, 2004, the entirety of which are incorporated herein by reference.

BACKGROUND

Heat-resistant paints suited for various applications are well known. Major types of such heat-resistant paints include, for example, binders such as aluminum phosphate, alkaline silicate, polysilicon alkoxide, or polysilazane.

In general, most high-temperature coatings based upon silicone polymers remain soft and sticky unless they are cured at very high temperatures. Also, many such coatings cannot be used on articles that have an operating temperature above 1200° F. Furthermore, many such coatings require an additional coating of a cathodic acrylic coating on insufficiently electrically insulated surfaces. For certain applications (e.g., exhaust manifolds on engines), the adjacent surfaces need the cathodic acrylic electrocoat, but any coating deposited on the exhaust manifold must be removed prior to reaching the end user to avoid burning and creating objectionable smoke. This is typically done using a rinsing step in processing prior to the engine passing through a curing oven intended to cure all of the electrocoat on the engine.

Thus, there is still a need for coating compositions that provide coatings with desirable adherent, protective, and heat-stable properties, particularly with high electrical insulation.

SUMMARY

The present invention provides a coating composition that provides high thermal resistance, such that it can be used on exhaust manifolds, for example, and preferably does not pick up significant amounts of a cathodic acrylic coating during an electrophoretic deposition coating procedure.

In one embodiment, the present invention provides a composition that includes: a resin system including a polysilazane and a polysiloxane and/or an aromatic hydrocarbon; and glass particles having a softening point below operating temperature, a coefficient of linear thermal expansion (CTE) of at least 80 in/in/° C., and a dielectric constant of at least 5.

In another embodiment, the present invention provides a composition that includes: a resin system including a polysilazane and a polysiloxane and/or an aromatic hydrocarbon; and glass particles having a softening point below operating temperature, a coefficient of thermal expansion of at least 80, and a dielectric constant of at least 5; wherein a cured coating prepared from the coating composition adheres to cast iron at a dry film thickness of 100 microns to 150 microns after being sprayed on a cast iron substrate, dried for 30 minutes at 150° C. or allowed to sit overnight at room temperature, and heated for 45 minutes at 760° C.

Preferably, a cured coating prepared from the coating composition, after being sprayed on a cast iron substrate (preferably, to achieve a dry film thickness of 100 microns to 150 micron), dried for 30 minutes at 150° C. or allowed to sit overnight at room temperature, and heated for 45 minutes at 760° C., no more than 20% (preferably, no more than 10%, and more preferably, no more than 1%) of the surface area of the substrate is coated with electrocoat after being subjected to an electrophoretic deposition coating process. Herein, the percentage is based on the total area of the substrate exposed to the electrophoretic deposition coating process, which includes rinsing with deionized water. Such percentages are based on visual inspection.

In certain embodiments, preferred glass particles have a coefficient of thermal expansion of no greater than 125.

In certain embodiments, preferred components, particularly glass particles, are selected such that a cured coating prepared from the coating composition adheres to cast iron at a dry film thickness of 100 microns to 150 microns after being sprayed on a cast iron substrate, dried for 30 minutes at 150° C. or allowed to sit overnight at room temperature, and heated for 45 minutes at 760° C.

In certain embodiments, preferred components, particularly glass particles, are selected such that for a cured coating prepared from the coating composition, after being sprayed on a cast iron substrate (preferably, to achieve a dry film thickness of 100 microns to 150 micron), dried for 30 minutes at 150° C. or allowed to sit overnight at room temperature, and heated for 45 minutes at 760° C., no more than 20% (preferably, no more than 10%, and more preferably, no more than 1%) of the surface area of the substrate is coated with electrocoat after being subjected to an electrophoretic deposition coating process, based on the total area of the substrate exposed to the electrophoretic deposition coating process.

In certain embodiments, preferred components, particularly glass particles, are selected such that for a cured coating prepared from the coating composition, after being sprayed on a cast iron substrate (preferably, to achieve a dry film thickness of 100 microns to 150 microns), dried for 30 minutes at 150° C. or allowed to sit overnight at room temperature, and heated for 2 hours at 760° C., no more than 20% of the surface area of the substrate is coated with electrocoat after being subjected to an electrophoretic deposition coating process, based on the total area of the substrate exposed to the electrophoretic deposition coating process.

In certain embodiments, preferred components, particularly glass particles, are selected such that for a cured coating prepared from the coating composition, after being sprayed on a cast iron substrate (preferably, to achieve a dry film thickness of 100 microns to 150 microns), dried for 30 minutes at 150° C. or allowed to sit overnight at room temperature, and heated for 4 hours at 880° C., no more than 20% of the surface area of the substrate is coated with electrocoat after being subjected to an electrophoretic deposition coating process, based on the total area of the substrate exposed to the electrophoretic deposition coating process.

In certain embodiments, the coating composition further includes an organic solvent. Preferably, the organic solvent is an aprotic solvent.

In certain embodiments, the coating composition further includes inorganic pigment powder. In certain embodiments, the coating composition further includes fumed silica.

The coating compositions described herein can be in one or two or more parts; however, typical coating compositions are provided in two parts. Preferably, such compositions include: a first part that includes the polysiloxane and/or aromatic hydrocarbon, an optional inorganic pigment powder, the glass particles, and an optional organic solvent; and a second part that includes the polysilazane.

In one embodiment, the present invention provides a coating composition that includes: a resin system including a polysilazane and a polysiloxane; and glass particles having a softening point below operating temperature, a coefficient of linear thermal expansion of at least 80 in/in/° C., and a dielectric constant of at least 5; wherein the glass particles are selected such that for a cured coating prepared from the coating composition, after being sprayed on a cast iron substrate (preferably, to achieve a dry film thickness of 100 microns to 150 microns), dried for 30 minutes at 150° C. or allowed to sit overnight at room temperature, and heated for 45 minutes at 760° C., no more than 20% of the surface area of the substrate is coated with electrocoat after being subjected to an electrophoretic deposition coating process, based on the total area of the substrate exposed to the electrophoretic deposition coating process.

In certain embodiments, the polysiloxane is a dimethylphenylpolysiloxane.

In certain embodiments, the polysilazane (which is used herein to encompass polysilazanes and polysiloxazanes) is of the formula: Z-A, wherein Z is any silazane or siloxazane polymer and A is an alkoxy silyl group of the formula: $—X—R^1—Si(R^2)_n(OR^3)_{3-n}$, wherein: X is bonded to a silicon atom of Z and is either O or $=NR^4$ wherein $R^4$ is a member selected from the group consisting of hydrogen, lower alkyl, lower alkenyl, aryl, lower alkoxy, silyl, siloxyl, and silazanyl; $R^1$ is alkylene optionally substituted with a heteroatom; each $R^2$ is independently a member selected from the group consisting of: (i) hydrogen, (ii) hydroxyl, (iii) C1 to C10 alkyl, either unsubstituted or substituted with hydroxyl, lower alkoxy, lower alkenyl, silyl, or $—N(R^5)_2$ where each $R^5$ is independently selected from the group consisting of hydrogen, lower alkyl, and lower alkenyl, (iv) C1 to C10 alkenyl, either unsubstituted or substituted with hydroxyl, lower alkoxy, silyl, or $—N(R^5)_2$, and (v) aryl of 1 or 2 rings, unsubstituted or substituted with hydroxyl, lower alkyl, lower alkenyl, lower alkoxy, silyl, or $—N(R^5)_2$, $R^3$ is the same as (iii), (iv), or (v); and n=0, 1, or 2, and the ratio of the total number of $OR^3$ groups of A to Si—N bonds in Z is generally from 0.05 to 2.5.

The present invention also provides articles that include a coating prepared from a composition of the present invention. Preferably, the article is an engine manifold.

The present invention also provides methods of coating a substrate, such as the substrate that forms an engine manifold (e.g., cast iron), the methods including applying a coating composition of the present invention on the substrate.

The term "adheres" to cast iron (or other substrate) means that before or immediately after the heating process, upon visible inspection, the coating does not flake off, chip, or otherwise come off of the substrate during normal handling (although no scratching or abrasion testing is conducted).

The phrase "softening point," according to ASTM C-338, refers to the temperature at which a round glass fiber, nominally 0.65 millimeter (mm) in diameter and 235 mm in length, elongates under its own weight at a rate of 1 mm/minute when the upper 100 mm of its length is heated at a rate of 5° C./minute. Typically, for such a test to be conducted, a representative specimen of 50 grams or more of flame workable glass in pieces at least 5 mm in diameter is used. Fritted or ground specimens can be melted to obtain a piece large enough from which fibers can be drawn.

The phrase "operating temperature" refers to the typical temperature of use of the article on which the coating is applied. For exhaust manifolds, a typical operating temperature is approximately 760° C. or lower. For example, some low horsepower engines run at 480° C. to 650° C.

The terms "comprises" and variations thereof do not have a limiting meaning where these terms appear in the description and claims.

As used herein, "a," "an," "the," "at least one," and "one or more" are used interchangeably.

Also herein, the recitations of numerical ranges by endpoints include all numbers subsumed within that range (e.g., 1 to 5 includes 1, 1.5, 2, 2.75, 3, 3.80, 4, 5, etc.).

When a group is present more than once in a formula described herein, each group is "independently" selected, whether specifically stated or not. For example, when more than one A group is present in a formula, each A group is independently selected. Furthermore, subgroups contained within these groups are also independently selected. For example, when each A group contains one or more $R^3$ groups, each $R^3$ is also independently selected.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Preferably, heat-resistant coating compositions of the present invention include a resin system that includes a polysilazane, and optionally a polysiloxane and/or optionally an aromatic hydrocarbon; glass particles having a softening point below operating temperature of the article being coated, a coefficient of linear thermal expansion of at least 80 in/in/° C., and a dielectric constant of at least 5; and optionally an organic solvent. A preferred resin system is that described in U.S. Pat. No. 6,652,978 (Lukacs, III et al.).

Polysilazanes

Useful polysilazanes for the coating compositions of the present invention include silazane and siloxazane polymers with selectively substituted alkoxy silyl groups or mixtures of such groups, wherein the polymers are capable of undergoing rapid moisture cure at room temperature conditions without requiring added catalyst. These moisture curable substituted silazane and siloxazane polymeric coatings not only have protective properties, e.g., corrosion resistance, but provide hard, durable coatings with excellent thermal stability while displaying good adhesion properties to a wide range of substrates.

Preferred silicon-containing polymers (referred to herein as polysilazanes) are alkoxy silyl substituted silazanes and siloxazanes of the formula:

Z-A wherein Z is a silazane or siloxazane polymer and A is an alkoxy silyl group of the formula:

$—X—R^1—Si(R^2)_n(OR^3)_{3-n}$ wherein:
X is bonded to a silicon atom of Z and is either O or $=NR^4$ wherein $R^4$ is a member selected from the group consisting of hydrogen, lower alkyl, lower alkenyl, aryl, lower alkoxy, silyl, siloxyl, and silazanyl;
$R^1$ is alkylene optionally substituted with a heteroatom;
$R^2$ is a member selected from the group consisting of:
 (i) hydrogen,
 (ii) hydroxyl,
 (iii) C1 to C10 alkyl, either unsubstituted or substituted with hydroxyl, lower alkoxy, lower alkenyl, silyl, or —N(R$^5$)$_2$ where R$^5$ is independently selected from the group consisting of hydrogen, lower alkyl, and lower alkenyl, (iv) C1 to C10 alkenyl, either unsubstituted or substituted with hydroxyl, lower alkoxy, silyl, or —N(R$^5$)$_2$, and (v) aryl of 1 or 2 rings, unsubstituted or substituted with hydroxyl, lower alkyl, lower alkenyl, lower alkoxy, silyl, or —N(R$^5$)$_2$, R$^3$ is the same as (iii), (iv), or (v);

n=0, 1, or 2, and the ratio of the total number of OR$^3$ groups of A to Si—N bonds in Z is generally from 0.05 to 2.5, preferably from 0.1 to 1.0, and most preferably from 0.1 to 0.50.

Generally, such silazane and siloxazane polymers, Z-A, such as those disclosed in U.S. Pat. No. 6,652,978 (Lukacs, III et al.), can be prepared by the reaction of preformed silazane or siloxazane polymers with certain reagents having reactive amine, ester, or hydroxyl functionalities. They can be prepared by heating a mixture of an alkoxy silyl reagent with the chosen polysilazanes or polysiloxazanes in the desired ratio, with the proviso that the ratio of the total number of OR$^3$ groups of A to Si—N bonds in Z, i.e., silazane or siloxazane polymer, prepared by the reaction is from 0.05 to 2.5, and preferably from 0.1 to 1.0, and most preferably from 0.1 to 0.50.

Preferably, the polysilazane is that available under the trade designation KION ML33/C33 from Kion Corp., Huntingdon Valley, Pa. Other suitable such components include that available under the trade designation KION ML33/C12 from Kion Corp., which is a moisture curable polysilazane with fewer alkoxy silyl groups than that of ML33/C33.

The compositions of the present invention preferably include at least one polysilazane in an amount of at least 16 wt-%, more preferably, at least 18 wt-%, and even more preferably, at least 21 wt-%, based on the total weight of the composition (including glass particles and optional organic solvent), whether in one or more parts.

The compositions of the present invention preferably include at least one polysilazane in an amount of no greater than 25 wt-%, more preferably, no greater than 23 wt-%, and even more preferably, no greater than 22 wt-%, based on the total weight of the composition (including glass particles and optional organic solvent), whether in one or more parts.

Polysiloxanes and Hydrocarbon Resins

The resin system also preferably includes a polysiloxane (preferably, an alkyl and/or aryl substituted polysiloxane, copolymers, blends, or mixtures thereof). Alternatively, aromatic hydrocarbon resins (preferably, alkyl-substituted aromatic hydrocarbon resins) can be used in addition to or in place of polysiloxanes, although polysiloxanes are preferred. The polysiloxane resin provides high thermal resistance to coatings of the present invention with a good balance of flexibility and hardness, which can improve chip resistance and durability of the coating. The hydrocarbon resin improves mechanical properties of the film.

The alkyl substitution preferably is selected from alkyl groups of 1 to 4 carbon atoms, more preferably 1 to 3 carbon atoms, and most preferably methyl and propyl, and the aryl substitution most preferably includes phenyl groups.

The polysiloxane may include organo-siloxane units, including dimethyl, diphenyl, methyl-phenyl, phenylpropyl, and their mixtures. Preferably, the polysiloxane is a dimethylphenylpolysiloxane.

Preferably, the polysiloxane is that available under the trade designation SR112 from GE Silicones, Waterford, N.Y. Other suitable such components include a polysiloxane available under the trade designation DC805 from Dow Corning, Midland, Mich. Suitable alkylated aromatic hydrocarbons include that available under the trade designation NEVCHEM 100 from Neville Chemical Company, Pittsburgh, Pa.

The polysiloxane and/or aromatic hydrocarbon is optional; however, compositions of the present invention preferably include at least one polysiloxane and/or aromatic hydrocarbon in an amount of at least 3 wt-%, more preferably, at least 4 wt-%, and even more preferably, at least 5 wt-%, based on the total weight of the composition (including glass particles and optional organic solvent), whether in one or more parts.

The compositions of the present invention preferably include at least one polysiloxane and/or aromatic hydrocarbon in an amount of no greater than 10 wt-%, more preferably, no greater than 8 wt-%, and even more preferably, no greater than 6 wt-%, based on the total weight of the composition (including glass particles and optional organic solvent), whether in one or more parts.

Glass Particles

Suitable glass particles, which function as a filler, include those that have suitable high temperature softening and crack-prevention properties and adhesion to cast iron. Also, suitable glass particles include those that will form a film at high temperatures. Preferably, suitable glass fillers include those that have a softening point below the operating temperature of the article to which the coating composition is applied.

Although a preferred resin system for the compositions of the present invention is disclosed in U.S. Pat. No. 6,652,978 (Lukacs, III et al.), commercially available such resins produce cured coatings that either crack or fall off the substrate, or they allow the attraction of too significant a level of electrocoat. Also, although U.S. Pat. No. 6,652,978 (Lukacs, III et al.) discloses the use of optional fillers, such as glass fillers, not all combinations of resins and fillers, or even all glass fillers, provide suitable coatings for high temperature applications, such as paints for exhaust manifolds, for example. Again, many filled resins, including many glass-filled resins, produce cured coatings that either crack or fall off the substrate, or they pick up too significant a level of electrocoat.

Applicants have discovered that suitable glass particles include those that melt and fuse to the substrate (e.g., cast iron substrate) at operating temperatures. Thus, suitable glass particles have a softening point below operating temperature, a coefficient of thermal expansion of at least 80, and a dielectric constant of at least 5. Such glass particles act as a high temperature plasticizer and flux in their molten state, which helps to prevent formation of too thick of a coating. Such glass particles also contribute to the dielectric strength of the coating, and help prevent the coating from cracking or losing adhesion. Such glass particles also fill in voids in the film during heat exposure, which helps to create a more continuous film and enhances the film's resistance to electrocoat pick up, presumably by blocking pathways for electrical current to pass (although this is not to be considered a limitation of the present invention). Such glass particles also help to enhance the dielectric strength of the coating due to their electrically insulative properties.

The softening point of suitable glass particles is preferably no greater than 760° C., more preferably, no greater than 720° C., even more preferably, no greater than 700° C., and even more preferably, no greater than 680° C.

The softening point of suitable glass particles is preferably at least 625° C., more preferably, at least 635° C., even more preferably, at least 645° C., and even more preferably, at least 655° C.

Suitable glass particles have a coefficient of linear thermal expansion of at least 80 in/in/° C. Preferably, the coefficient of linear thermal expansion is no greater than 125, and more preferably, no greater than 100 in/in/° C.

Suitable glass particles have a dielectric constant of at least 5. Generally, there is no upper limit to the dielectric constant of the glass particles.

The glass particles can be in any of a wide variety of shapes (e.g., spherical, elongated) and sizes. Preferably, glass particles have an average particle size of at least 10 microns, and more preferably, at least 15 microns. Preferably, glass particles have an average particle size of no greater than 200 microns, more preferably, no greater than 100 microns, and even more preferably, no greater than 60 microns. Preferably, glasses are of a size such that at least 80%, more preferably at least 90%, and even more preferably at least 95%, of the material will pass through a 325 mesh (45 micron) screen.

For certain embodiments, glass particles (and other components of coating composition) are selected such that a cured coating prepared from the coating composition adheres to cast iron at a dry film thickness of 100 microns to 150 microns after being sprayed on a cast iron substrate, dried for 30 minutes at 300° F. (150° C.) or allowed to sit overnight at room temperature, and heated for 45 minutes at 1400° F. (760° C.). Herein, "adheres" to cast iron (or other substrate) means that before or immediately after the heating process (e.g., heating at 45 minutes at 1400° F. (760° C.)), upon visible inspection, the coating does not flake off, chip, or otherwise come off the substrate during normal handling (although no scratching or abrasion testing is conducted).

For certain embodiments, glass particles (and other components of coating composition) are selected such that a cured coating prepared from the coating composition adheres to cast iron at a dry film thickness of 100 microns to 150 microns after being sprayed on a cast iron substrate, dried for 30 minutes at 300° F. (150° C.) or allowed to sit overnight at room temperature, and heated for 2 hours at 1400° F. (760° C.).

For certain embodiments, glass particles (and other components of the coating composition) are selected such that a cured coating prepared from the coating composition adheres to cast iron at a dry film thickness of 100 microns to 150 microns after being sprayed on a cast iron substrate, dried for 30 minutes at 300° F. (150° C.) or allowed to sit overnight at room temperature, and heated for 4 hours at 1616° F. (880° C.).

Preferably, for coatings having a dry film thickness of 4-6 mils (0.10-0.15 mm), there is little or no visible cracking. At higher dry film thicknesses (e.g., 8 mils or 0.2 mm), some cracking may become visible, but this is not necessarily a problem unless a significant amount of electrocoat is deposited on the substrate in an electrophoretic coating deposition process.

For certain embodiments, glass particles (and other components of the coating composition) are selected such that for a cured coating prepared from the coating composition, after being sprayed on a cast iron substrate (preferably, to achieve a dry film thickness of 100 microns to 150 microns), dried for 30 minutes at 300° F. (150° C.) or allowed to sit overnight at room temperature, and heated for 45 minutes at 1400° F. (760° C.), no more than 20% of the area of the substrate is coated with electrocoat (i.e., e-coat) (by visual inspection) after being subjected to an electrophoretic deposition coating process. Herein, the electrocoat percentages are based on the total area of the substrate exposed to the electrophoretic coating process. Such percentages are determined after rinsing the substrate with deionized water and upon visual inspection. That is, a deposited electrocoat is one that remains after rinsing the substrate with deionized water. For example, no more than 20% of the surface area of the substrate remains coated with e-coat after being subjected to the electrophoretic deposition process described in the Examples, which involves rinsing with deionized water.

For certain embodiments, glass particles (and other components of the coating composition) are selected such that for a cured coating prepared from the coating composition, after being sprayed on a cast iron substrate (preferably, to achieve a dry film thickness of 100 microns to 150 microns), dried for 30 minutes at 300° F. (150° C.) or allowed to sit overnight at room temperature, and heated for 2 hours at 1400° F. (760° C.), no more than 20% of the surface area of the substrate is coated with electrocoat (i.e., e-coat) after being subjected to an electrophoretic deposition coating process, based on the total area of the substrate exposed to the electrophoretic deposition coating process.

For certain embodiments, glass particles (and other components of the coating composition) are selected such that for a cured coating prepared from the coating composition, after being sprayed on a cast iron substrate (preferably, to achieve a dry film thickness of 100 microns to 150 microns), dried for 30 minutes at 300° F. (150° C.) or allowed to sit overnight at room temperature, and heated for 4 hours at 1616° F. (880° C.), no more than 20% of the surface area of the substrate is coated with electrocoat (i.e., e-coat) after being subjected to an electrophoretic deposition coating process, based on the total area of the substrate exposed to the electrophoretic deposition coating process.

More preferably, the glass particles (and other components of the coating composition) are selected such that a for cured coating (preferably, at a dry film thickness of 100 microns to 150 microns) prepared from the coating composition no more than 10% of the surface area of the substrate is coated with e-coat after being subjected to an electrophoretic deposition coating process. Even more preferably, the glass particles are selected such that a cured coating (preferably, at a dry film thickness of 100 microns to 150 microns) prepared from the coating composition does not pick up more than 1% e-coat (i.e., no more than 1% of the surface area of the substrate is coated with e-coat) when subjected to an electrophoretic deposition coating process.

Preferably, the glass particles are those available under the trade designation ELAN 13 (alkali barium glass, CTE=89, DC=5.6, Softening Point=659° C.) from Elan Technology, Midway, Ga. Other suitable glasses include those available under the trade designations ELAN 82 (soda lime glass, CTE=93, Softening Point=705° C.) and ELAN 63 (soda lime glass, CTE=97, DC=5.4, Softening Point=625° C.) from Elan Technology, CORNING 9013 (alkali barium glass) from Corning Corp., Corning, N.Y., FERRO FRIT 3882 (alkali barium glass) from Ferro Corp., Cleveland, Ohio, UROBOROS 90 (soda lime glass, CTE=90, DC=estimated 7-10, Softening Point=approximately 700° C.) and UROBOROS 96 (soda lime glass, CTE=96, DC=estimated 7-10, Softening Point=approximately 700° C.) from Uroboros Glass Studios, Portland, Oreg., and POTTERS 3000A (soda lime glass, CTE=90, DC=6.9, Softening Point=704° C.) from PQ Corp., Berwyn, Pa. More than one type of glass can be used, if desired.

The compositions of the present invention preferably include glass particles in an amount of at least 35 wt-%, more preferably, at least 45 wt-%, and even more preferably, at least 50 wt-%, based on the total weight of the composition (including glass particles and organic solvent), whether in one or more parts.

The compositions of the present invention preferably include glass particles in an amount of no greater than 65 wt-%, more preferably, no greater than 55 wt-%, and even more preferably, no greater than 52 wt-%, based on the total weight of the composition (including glass particles and optional organic solvent), whether in one or more parts.

Thixotrophic Agents

In addition to the glass particles, which act as a filler, other thickening or thixotrophic agents (i.e., thixotropes or rheology control agents) can be included in compositions of the present invention if desired. These include particles selected from fumed silica, calcium sulphonate, bentonite clays, and other inorganic thixotropes such as amorphous silica, colloidal silica, alumina, colloidal alumina, titanium dioxide, cesium oxide, yttrium oxide, colloidal yttria, zirconia, colloidal zirconia, and mixtures of any of the foregoing. Preferred thixotropes do not increase electrical conductivity of a cured coating prepared from the coating composition.

Preferably, the thixotrophic agent is fumed silica available under the trade designations AEROSIL 200 from Degussa Corp., Parsippany, N.Y., and CAB-O-SIL from Cabot Corp., Aplharetta, Ga. Other suitable such components include calcium sulphonate available under the trade designation IRCO-GEL 905 from Lubrizol, Wickliffe, Ohio, and K-STAY 501 from King Ind., Norwalk, Conn.

The thixotrope is optional; however, preferred compositions include at least 0.2 wt-% total amount of thixotrophic agents, and more preferably, at least 0.5 wt-%, based on the total weight of the coating composition (whether in one or more parts).

Preferred compositions include no more than 10.0 wt-% total amount of thixotrophic agents, and more preferably, no greater than 8.0 wt-%, based on the total weight of the coating composition (whether in one or more parts). For certain fumed silica, no more than 2.0 wt-% is typically used as it can cause a reduction in the dielectric strength of the cured coating.

Organic Solvents

Compositions of the present invention can also include one or more organic solvents, which can be any of a wide variety of solvents, although this is optional. Preferably, the solvents are aprotic (i.e., they do not include an —OH or acid group). The solvent is preferably selected to enhance coating and for its evaporative qualities, depending on the rate of drying that is desired. Examples include toluene, mineral spirits, xylene, benzene, naphtha (e.g., light, medium, or heavy aromatic naphtha), methyl ethyl ketone, diisobutyl ketone, propylene glycol monomethyl ether acetate, butyl acetate, parachlorobenzotrifluoride, tetrahydrofuran, etc. Mixtures of various solvents can be used if desired.

The organic solvent is optional; however, compositions of the present invention preferably include at least one organic solvent in an amount of at least 15 wt-%, more preferably, at least 20 wt-%, and even more preferably, at least 23 wt-%, based on the total weight of the composition (including glass particles and the organic solvent), whether in one or more parts.

The compositions of the present invention preferably include organic solvent(s) in an amount of no greater than 35 wt-%, more preferably, no greater than 30 wt-%, and even more preferably, no greater than 25 wt-%, based on the total weight of the composition (including glass particles and the organic solvent), whether in one or more parts.

Optional Additives

Certain coating compositions of the present invention may also include one or more of a group of ingredients that can be called performance enhancing additives, if desired. Typical performance enhancing additives that may be employed include surface active agents, colorants (e.g., pigments or dyes), surfactants, thickeners, heat stabilizers, leveling agents, anti-cratering agents, curing indicators, plasticizers, sedimentation inhibitors, ultraviolet-light absorbers, optical brighteners, and the like, to modify properties.

Coating compositions may optionally include a surface-active agent that modifies the interaction of the curable coating composition with the substrate, in particular, the agent can modify the ability of the composition to wet a substrate. Surface active agents may have other properties as well. For example, surface active agents may also include leveling, defoaming, or flow agents, and the like. The surface active agent affects qualities of the curable coating composition including how the coating composition is handled, how it spreads across the surface of the substrate, and how it bonds to the substrate. The surface active agent may make up 0-5% by weight of the curable coating composition.

Surface active agents suitable for use in coating compositions are known to those of skill in the art or can be determined using standard methods. Exemplary surface active agents include polydimethylsiloxane surface active agents (such as those commercially available under the trade designations SILWET L-760 and SILWET L-7622 from OSI Specialties, South Charleston, W. Va., or BYK 306 from Byk-Chemie, Wallingford, Conn.) and fluorinated surface active agents (such as that commercially available as FLUORAD FC-430 from 3M Co., St. Paul, Minn.).

The surface active agents may include a defoamer. Suitable defoamers include polysiloxane defoamers (such as a methylalkylpolysiloxane like that commercially available under the trade designation BYK 077 or BYK 500 from Byk-Chemie) or polymeric defoamers (such as that commercially available under the trade designation BYK 051 from Byk-Chemie).

For some applications, a coating that is opaque, colored, pigmented or has other visual characteristics is desired. Agents to provide such properties can also be included in coating compositions of the present invention. Pigments for use with the present invention are known in the art. Suitable pigments, however, are stable (i.e., do not burn or vaporize) at the operating temperatures of the coated articles. Various mixed metal oxide pigments are available from Shepherd (Cincinnati, Ohio) and Ferro (Cleveland, Ohio). The composition can also include a gloss control additive or an optical brightener, although these should be stable (i.e., not burn or vaporize) at the operating temperatures of the coated articles.

The invention may also include other ingredients that modify properties of the curable coating composition as it is stored, handled, or applied, and at other or subsequent stages, although such additives should be stable at the operating temperatures of the coated articles. Flatting agents, mar and abrasion additives, and other similar performance enhancing additives may be employed in this invention as required in amounts effective to upgrade the performance of the cured coating and the coating composition. Desirable performance characteristics of the coating include chemical resistance, abrasion resistance, hardness, gloss, reflectivity, appearance, or combinations of these characteristics, and other similar characteristics.

Coating Compositions and Methods

Coating compositions of the present invention are preferably in two parts. A first part preferably includes the polysiloxane and/or aromatic hydrocarbon, the glass particles, and the optional organic solvent (and optional pigment and/or other ingredients). A second part preferably includes the polysilazane. The two parts are combined and then applied, typically by spraying, although other methods of application can also be used (e.g., dip coating, flow coating, electrostatic coating). The standard mixing ratio is 2.5 parts of the first part and 1 part of the second, although mix ratios of 2:1 and 3:1 also work. The mix ratio will typically depend on the composition of the first part.

At least partial curing of coating compositions of the present invention occur in an atmosphere which promotes crosslinking of the polymer by its reaction with moisture. These curing atmospheres include, but are not limited to, air and other non-reactive or reactive gaseous environments which contain moisture, such as inert gases like nitrogen and argon, and reactive gases such as ammonia, hydrogen, carbon monoxide, and the like. Rapid cure times are achieved when the applied coatings are exposed to the moisture-containing atmosphere at room temperature.

The cured coatings of the present invention may be used in a wide variety of contexts, insofar as they protect virtually any type of substrate, but particularly metal substrates (e.g., cast iron) from oxidative thermal degradation, corrosion, or chemical attack.

EXAMPLES

Objects and advantages of this invention are further illustrated by the following examples, but the particular materials and amounts thereof recited in these examples, as well as other conditions and details, should not be construed to unduly limit this invention.

Examples 1-5

Each formula was made using the following procedure:
1.) The first three items (the silicone resin, the VM&P, and the IRCOGEL 905) were charged into a mixing vessel.

|  | Composition 1 (parts by wt.) | Composition 2 (parts by wt.) | Composition 3 (parts by wt.) | Composition 4 (parts by wt.) | Composition 5 (Comparative) (parts by wt.) |
|---|---|---|---|---|---|
| PART "A" Components |  |  |  |  |  |
| Dimethylphenyl-polysiloxane Resin (SR 112 GE Silicones) | 60.04 | 60.04 | 60.04 | 60.04 | 60.04 |
| VM&P Naphtha | 208.81 | 208.81 | 208.81 | 208.81 | 208.81 |
| Calcium Sulphonate (IRCOGEL 905 from Lubrizol) | 45.23 | 45.23 | 45.23 | 45.23 | 45.23 |
| Manganese Ferrite Black Spinel (Black 444 From Shephed) | 17.42 | 17.42 | 17.42 | 17.42 | 17.42 |
| Fumed Silica (AEROSIL 200 From Degussa) | 10.61 | 10.61 | 10.61 | 10.61 | 10.61 |
| Glass Powder (ELAN 13 from Elan Technologies) | 757.59 | 0 | 0 | 0 | 0 |
| Glass Powder (ELAN 63 from Elan Technologies) | 0 | 757.59 | 0 | 0 | 0 |
| Glass Powder (ELAN 82 from Elan Technologies) | 0 | 0 | 757.59 | 0 | 0 |
| Glass Powder (Potters 3000A from PQ Corporation) | 0 | 0 | 0 | 757.59 | 0 |
| Glass Powder (Potters 3000E from PQ Corporation) | 0 | 0 | 0 | 0 | 757.59 |
| VM&P Naphtha | 87.97 | 87.97 | 87.97 | 87.97 | 87.97 |
| PART "B" Components |  |  |  |  |  |
| Polysilazane Resin (ML33/C33 from Kion Corporation) | 322.40 | 322.40 | 322.40 | 322.40 | 322.40 |

2.) The materials in the vessel were mixed together until uniform using a cowles dissolver.
3.) The Black 444, AEROSIL 200, and glass powder were then added to the first three ingredients under high speed agitation and allowed to mix for 15 to 30 minutes until homogeneous. During the dispersing phase of manufacturing, the sides of the mixing vessel are scraped down two to three times to ensure homogeneity.
4.) After the mixture was homogenous, the second measure of VM&P naphtha was added.
5.) Just prior to use, the polysilazane resin was added to the "A" component.

Example 6

A one-part (i.e., one-component) formulation containing NEVCHEM 100 aromatic hydrocarbon resin was prepared using the following ingredients.

| Component: | Constituency by weight: |
|---|---|
| Kion ML33/C33 Polysilazane | 94.22 |
| Shepherd Black 444 Pigment | 6.281 |
| Elan 13 Glass powder | 301.463 |
| IRCOGEL 905 Calcium Sulphonate | 16.301 |
| AEROSIL 200 Fumed Silica | 3.835 |
| Xylene | 40.89 |
| VM&P Naphtha | 51.115 |
| NEVCHEM 100 Aromatic Hydrocarbon | 31.41 |
| Toluene | 30.669 |

This formulation was made using the following procedure:
1.) The polysilazane resin, the calcium sulphonate, and the xylene were charged into a mixing vessel.
2.) The materials in the tank were mixed together until uniform using a Cowles dissolver.
3.) The Black 444, AEROSIL 200, and glass powder were then added to the first three ingredients under high speed agitation and allowed to mix for 15 to 30 minutes until homogeneous. During the dispersing phase of manufacturing, the sides of the mixing vessel were scraped down two to three times to ensure homogeneity.
4.) After the mixture was homogenous, the VM&P naphtha was added.
5.) The aromatic hydrocarbon resin was then dissolved into the toluene in a separate container and the mixture was added to the batch.

This formulation was one component and required no additional polysilazane be added before application. This formulation can be made to be a two-component formulation, like Examples 1 through 5. The purpose of having two components is to keep the polysilazane from reacting with any residual moisture in the pigments, resins, or solvents. It is possible to keep moisture out of the system and make a one component system; however, this may not be feasible in production of large commercial quantities of material. The hydrocarbon resin is either oxidized or vaporized or both at the operating temperatures, so when it leaves the film it changes the color of the film from black to light tan. Performance was otherwise unaffected.

Testing of Examples 1-6

Each system was then sprayed onto untreated 4 inch×6 inch×3/16 inch cast iron panels or 4 inch×6 inch×1/8 inch shot blast steel panels to achieve a dry film of 100 microns to 150 microns. Similar results are obtained on either substrate. Then the panels were either allowed to dry at ambient temperatures (22-25° C.) and humidity (40-60% RH) for 16 hours minimum or were force dried for 30 minutes at 150° C. Either curing method can be used with similar results.

Each of the panels tested was placed in an electric furnace for 45 minutes at 760° C. After 45 minutes of heat exposure, the panels were removed from the furnace and allowed to cool to ambient temperature. When the panel was cool, it was placed in a cathodic acrylic electrophoretic deposition coating bath (commercially available under the trade designation WAY0012 from Valspar) at 250 volts for 2 minutes with voltage being ramped up from 0 to 250 over the span of 10 to 15 seconds. The electrical current was then shut off and the panel was removed from the bath and rinsed with deionized water.

If the coating passes the test, the paint should be in good condition and adhere well to the substrate after the heat exposure and the majority of the electrocoat (80%) will rinse off of the panel with the deionized water rinse.

Examples 1 through 4 and 6 passed testing. Example 2 required 175 microns dry film thickness for good e-coat resistance (less than 20% coverage); however, at less than 175 microns the e-coat covered about 50% of the panel. Example 5 had 100% e-coat coverage after rinsing (the glass contained therein had a Coefficient of Thermal Expansion of 28).

Certain other formulations were tested that did not include a polysiloxane (e.g., SR 112 GE silicone). Some of these passed and some of these failed the tests described herein. It is believed that those that failed could have been improved by varying the coating thickness and/or by incorporating a polysiloxane into the formulation.

Certain other formulations were tested that did include a polysiloxane (e.g., SR 112 GE silicone). Some of these passed and some of these failed the tests described herein. It is believed that those that failed could have been improved by varying the coating thickness and/or reducing the amount of and/or eliminating the polysiloxane in the formulation.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A coating composition comprising:
   a resin system comprising a polysilazane and further comprising a polysiloxane and/or aromatic hydrocarbon resin; and
   glass particles having a softening point below operating temperature of at least about 625° C. to no greater than about 760° C., a coefficient of linear thermal expansion of at least $80 \times 10^{-7}$ in/in/° C., and a dielectric constant of at least 5.

2. The composition of claim 1, wherein the composition comprises a first part and a second part, wherein
   the first part comprises the polysiloxane and/or aromatic hydrocarbon resin, an optional inorganic pigment powder, the glass particles, and an optional organic solvent; and
   the second part comprises the polysilazane.

3. The composition of claim 1 wherein the glass particles have a coefficient of linear thermal expansion of no greater than $125 \times 10^{-7}$ in/in/° C.

4. The composition of claim 1 wherein the glass particles are selected such that a cured coating prepared from the coating composition adheres to cast iron at a dry film thickness of 100 microns to 150 microns after being sprayed on a cast iron substrate, dried for 30 minutes at 150° C. or allowed to sit overnight at room temperature, and heated for 45 minutes at 760° C.

5. The composition of claim 4 wherein the glass particles are selected such that for a cured coating prepared from the coating composition, after being sprayed on a cast iron substrate, dried for 30 minutes at 150° C. or allowed to sit overnight at room temperature, and heated for 2 hours at 760° C., no more than 20% of the surface area of the substrate is coated with electrocoat after being subjected to an electrophoretic deposition coating process, based on the total area of the substrate exposed to the electrophoretic deposition coating process.

6. The composition of claim 1 wherein the glass particles are selected such that for a cured coating prepared from the coating composition, after being sprayed on a cast iron substrate, dried for 30 minutes at 150° C. or allowed to sit overnight at room temperature, and heated for 45 minutes at 760° C., no more than 20% of the surface area of the substrate is coated with electrocoat after being subjected to an electrophoretic deposition coating process, based on the total area of the substrate exposed to the electrophoretic deposition coating process.

7. The composition of claim 6 wherein the glass particles are selected such that for a cured coating prepared from the coating composition no more than 10% of the surface area of the substrate is coated with electrocoat after being subjected to an electrophoretic deposition coating process, based on the total area of the substrate exposed to the electrophoretic deposition coating process.

8. The composition of claim 7 wherein the glass particles are selected such that for a cured coating prepared from the coating composition no more than 1% of the surface area of the substrate is coated with electrocoat after being subjected to an electrophoretic deposition coating process, based on the total area of the substrate exposed to the electrophoretic deposition coating process.

9. The composition of claim 1 wherein the glass particles are selected such that for a cured coating prepared from the coating composition, after being sprayed on a cast iron substrate, dried for 30 minutes at 150° C. or allowed to sit overnight at room temperature, and heated for 4 hours at 880° C., no more than 20% of the surface area of the substrate is coated with electrocoat after being subjected to an electrophoretic deposition coating process, based on the total area of the substrate exposed to the electrophoretic deposition coating process.

10. The composition of claim 1 wherein the coating composition further comprises an organic solvent.

11. The composition of claim 10 wherein the organic solvent is an aprotic solvent.

12. The composition of claim 1 wherein the coating composition further comprises inorganic pigment powder.

13. The composition of claim 1 further comprising fumed silica.

14. An article comprising a coating prepared from the composition of claim 1.

15. The article of claim 14 which is an engine exhaust manifold.

16. A coating composition comprising:
a resin system comprising a polysilazane and further comprising a polysiloxane and/or aromatic hydrocarbon resin; and
glass particles having a softening point below operating temperature of at least about 625° C. to no greater than about 760° C., a coefficient of linear thermal expansion of at least $80 \times 10^{-7}$ in/in/° C., and a dielectric constant of at least 5;
wherein a cured coating prepared from the coating composition adheres to cast iron at a dry film thickness of 100 microns to 150 microns after being sprayed on a cast iron substrate, dried for 30 minutes at 150° C. or allowed to sit overnight at room temperature, and heated for 45 minutes at 760° C.

17. The composition of claim 16 wherein for a cured coating prepared from the coating composition, after being sprayed on a cast iron substrate, dried for 30 minutes at 150° C. or allowed to sit overnight at room temperature, and heated for 45 minutes at 760° C., no more than 20% of the surface area of the substrate is coated with electrocoat after being subjected to an electrophoretic deposition coating process, based on the total area of the substrate exposed to the electrophoretic deposition coating process.

18. An article comprising a coating prepared from the composition of claim 16.

19. The article of claim 18 which is an engine exhaust manifold.

20. A coating composition comprising:
a resin system comprising a polysilazane and a polysiloxane; and
glass particles having a softening point below operating temperature of at least about 625° C. to no greater than about 760° C., a coefficient of linear thermal expansion of at least $80 \times 10^{-7}$ in/in ° C., and a dielectric constant of at least 5;
wherein the glass particles are selected such that for a cured coating prepared from the coating composition, after being sprayed on a cast iron substrate, dried for 30 minutes at 150° C. or allowed to sit overnight at room temperature, and heated for 45 minutes at 760° C., no more than 20% of the surface area of the substrate is coated with electrocoat after being subjected to an electrophoretic deposition coating process, based on the total area of the substrate exposed to the electrophoretic deposition coating process.

21. The composition of claim 20 wherein the glass particles are selected such that a cured coating prepared from the coating composition adheres to cast iron at a dry film thickness of 100 microns to 150 microns after being sprayed on a cast iron substrate, dried for 30 minutes at 150° C. or allowed to sit overnight at room temperature, and heated for 45 minutes at 760° C.

22. The composition of claim 20 wherein the polysilazane is of the formula:

$$Z-A$$

wherein Z is any silazane or siloxazane polymer and A is an alkoxy silyl group of the formula:

$$-X-R^1-Si(R^2)_n(OR^3)_{3-n}$$

wherein:
X is bonded to a silicon atom of Z and is either O or $=NR^4$ wherein $R^4$ is a member selected from the group consisting of hydrogen, C1 to C6 alkyl, C2 to C6 alkenyl, aryl, C1 to C6 alkoxy, silyl, siloxyl, and silazanyl;

$R^1$ is alkylene optionally substituted with a heteroatom;
each $R^2$ is independently a member selected from the group consisting of:
(i) hydrogen,
(ii) hydroxyl,
(iii) C1 to C10 alkyl, either unsubstituted or substituted with hydroxyl, C1 to C6 alkoxy, C2 to C6 alkenyl, silyl, or —N($R^5$)$_2$ where each $R^5$ is independently selected from the group consisting of hydrogen, C1 to C6 alkyl, and C2 to C6 alkenyl,
(iv) C1 to C10 alkenyl, either unsubstituted or substituted with hydroxyl, C1 to C6 alkoxy, silyl, or —N($R^5$)$_2$, and
(v) aryl of 1 or 2 rings, unsubstituted or substituted with hydroxyl, C1 to C6 alkyl, C2 to C6 alkenyl, C1 to C6 alkoxy, silyl, or —N($R_5$)$_2$,
$R^3$ is the same as (iii), (iv) or (v); and
n=0, 1 or 2, and the ratio of the total number of $OR^3$ groups of A to Si—N bonds in Z is generally from 0.05 to 2.5.

23. An article comprising a coating prepared from the composition of claim 20.

24. The article of claim 23 which is an engine exhaust manifold.

25. A method of coating a substrate, the method comprising applying to the substrate a coating composition comprising:
a resin system comprising a polysilazane and a polysiloxane and/or an aromatic hydrocarbon resin; and
glass particles having a softening point below operating temperature of at least about 625° C. to no greater than about 760° C., a coefficient of linear thermal expansion of at least $80 \times 10^{-7}$ in/in/° C., and a dielectric constant of at least 5.

26. The method of claim 25 wherein the substrate comprises cast iron.

27. The method of claim 26 wherein the substrate forms a part of an engine exhaust manifold.

28. A method of coating a substrate, the method comprising applying to the substrate a coating composition comprising:
a resin system comprising a polysilazane and a polysiloxane; and
glass particles having a softening point below operating temperature of at least about 625° C. to no greater than about 760° C., a coefficient of linear thermal expansion of at least $80 \times 10^{-7}$ in/in/° C., and a dielectric constant of at least 5;
wherein the glass particles are selected such that for a cured coating prepared from the coating composition, after being sprayed on a cast iron substrate, dried for 30 minutes at 150° C. or allowed to sit overnight at room temperature, and heated for 45 minutes at 760° C., no more than 20% of the surface area of the substrate is coated with electrocoat after being subjected to an electrophoretic deposition coating process, based on the total area of the substrate exposed to the electrophoretic deposition coating process.

29. The method of claim 28 wherein the substrate comprises cast iron.

30. The method of claim 29 wherein the substrate forms a part of an engine manifold.

* * * * *